United States Patent [19]

Andrews et al.

[11] Patent Number: 4,561,054

[45] Date of Patent: Dec. 24, 1985

[54] FILM-BASED DUAL ENERGY RADIOGRAPHY

[75] Inventors: Edward W. Andrews, Brookfield; Thomas W. Lambert, Dousman, both of Wis.

[73] Assignee: General Electric Company, Schenectady, N.Y.

[21] Appl. No.: 541,772

[22] Filed: Oct. 13, 1983

[51] Int. Cl.$^4$ ............................................. H04N 7/18
[52] U.S. Cl. ..................................... 364/414; 378/174; 358/111
[58] Field of Search ................ 364/414; 378/174, 175, 378/176; 358/111; 250/327.2, 491.1

[56] References Cited

U.S. PATENT DOCUMENTS

| | | | |
|---|---|---|---|
| 3,509,337 | 4/1970 | Clark et al. | 378/174 |
| 4,029,963 | 6/1977 | Alvarez et al. | 378/62 |
| 4,394,737 | 7/1983 | Komaki et al. | 364/414 |
| 4,399,457 | 8/1983 | Riederer et al. | 364/414 |
| 4,491,866 | 1/1985 | Verhoeven | 364/414 |
| 4,503,459 | 3/1985 | Haendle et al. | 364/414 |

Primary Examiner—Jerry Smith
Assistant Examiner—Allen MacDonald
Attorney, Agent, or Firm—Fuller, House & Hohenfeldt

[57] ABSTRACT

Apparatus for reading out individual X-ray images recorded on a double-emulsion radiographic film or on separate films that were coincident when exposed simultaneously to a polyenergetic or broad X-ray photon energy spectrum beam emergent from a body and where an image corresponding to one obtained with a low energy part of the spectrum is formed on one film and an image corresponding to a higher energy part of the spectrum is formed on the other. One readout apparatus is for the case of two separate films which, after development, are illuminated from the back and optically scanned to derive analog signals representative of the intensities of spatially corresponding picture elements on each film. Another apparatus is for the case where the two images are on opposite sides of a film and are represented by alternate fine image information lines obtained by interposing a grid during the X-ray exposure. Another is for the case where a reflective layer is disposed between the film images during readout. In all cases the films are optically scanned and the resulting analog signals are digitized and variously processed to yield an image representative of that which is different between the two original different energy images.

11 Claims, 14 Drawing Figures

FILM-BASED DUAL ENERGY RADIOGRAPHY

CROSS-REFERENCES TO RELATED APPLICATIONS

This application is related to Ser. Nos.: 541,786, now U.S. Pat. No. 4,513,078; 541,468, now U.S. Pat. No. 4,526,862; and, 541,785, all filed on Oct. 13, 1983.

BACKGROUND OF THE INVENTION

This invention relates to apparatus and a method for performing dual energy radiography to enable subtraction of X-ray images so that in the resulting difference image, anatomical information that is obscuring is cancelled and image information that is of interest is retained and, furthermore, enhanced.

One known X-ray image subtraction procedure is characterized as energy subtraction. Energy subtraction is based on the fact that, while the attenuation or absorption of X-radiation by a material depends on the energy or wavelength of the X-rays, this energy dependence is different for different materials. Suppose having different materials 1 and 2 of thicknesses $t_1$ and $t_2$, respectively, and measuring the thickenesses $t_1$ and $t_2$ is the objective. If X-rays of energy $E_1$ are transmitted through the unknown object the transmitted intensity will be:

$$I_1 = I_{01} exp(-t_1\mu_{11} - t_2\mu_{21}) \qquad [\text{Eq. }1a]$$

where $I_{01}$ is the unattenuated intensity and $\mu_{11}$ and $\mu_{21}$ are the attenuation coefficients of the two materials at energy $E_1$. If an analogous measurement is made at energy $E_2$ the following applies:

$$I_2 = I_{02} exp(-t_1\mu_{12} - t_2\mu_{22}) \qquad [\text{Eq. }1b]$$

where $I_{02}$ and $I_2$ are the incident and transmitted intensities, respectively, and $\mu_{12}$ and $\mu_{22}$ are the attenuation coefficients of materials 1 and 2, respectively, at energy $E_2$.

Reorganizing the foregoing equations yields:

$$\ln\left(\frac{I_{01}}{I_1}\right) = t_1\mu_{11} + t_2\mu_{21} \qquad [\text{Eq. }2a]$$

and $$\ln\left(\frac{I_{02}}{I_2}\right) = t_1\mu_{11} + t_2\mu_{22} \qquad [\text{Eq. }2b]$$

Those equations can be solved for $t_1$ and $t_2$:

$$t_1 = \gamma_{11}\ln\left(\frac{I_{01}}{I_1}\right) + \gamma_{12}\ln\left(\frac{I_{02}}{I_2}\right) \qquad [\text{Eq. }3a]$$

and $$t_2 = \gamma_{21}\ln\left(\frac{I_{01}}{I_1}\right) + \gamma_{22}\ln\left(\frac{I_{02}}{I_2}\right) \qquad [\text{Eq. }3b]$$

where $\gamma_{11} = \dfrac{\mu_{22}}{\mu_{11}\mu_{22} - \mu_{12}\mu_{21}}$ $\gamma_{12} = \dfrac{-\mu_{21}}{\mu_{11}\mu_{22} - \mu_{12}\mu_{21}}$ $\gamma_{21} = \dfrac{-\mu_{12}}{\mu_{11}\mu_{22} - \mu_{12}\mu_{21}}$ Hence, with an object having two material components that differ in the energy dependence of their X-ray attenuation (caused by a difference in atomic numbers), separate images of the two components can be formed. This is done by first producing an image at energy $E_1$ and image at energy $E_2$ as in equations 2a and 2b. These two images can be combined as shown in Eqs. 3a and 3b to produce the material selective images. The images formed using Eq. 3a would have only contributions from material 1 since material 2 is subtracted out. Conversely, the image formed using Eq. 3b has material 1 cancelled or subtracted out. In this way, separate images of the bones and soft tissues in a human chest, for example, can be produced using images at two X-ray energies.

The derivation presented above is, unfortunately, rigorously valid only if the X-ray beams are monoenergetic. Typically, only broad energy spectrum or polyenergetic X-ray beams are available. In this more complicated physical situtation Eqs. 1 and 2 are no longer strictly valid due to the energy dependence of the attenuation coefficients. However, Eqs. 3 are still acceptable for some applications. If more accurate estimates of $t_1$ and $t_2$ are required, they are generally produced by higher order expansions, for example:

$$t_1 = \qquad [\text{Eq. }5a]$$

$$\gamma_{11}\ln\left(\frac{I_{01}}{I_1}\right) + \gamma_{12}\ln\left(\frac{I_{02}}{I_2}\right) + \gamma_{13}\left(\ln\left(\frac{I_{01}}{I_1}\right)\right)^2 +$$

$$\gamma_{14}\left(\ln\left(\frac{I_{02}}{I_2}\right)\right)^2 + \gamma_{15}\ln\left(\frac{I_{01}}{I_1}\right)\ln\left(\frac{I_{02}}{I_2}\right)$$

and similarly:

$$t_2 = \qquad [\text{Eq. }5b]$$

$$\gamma_{21}\ln\left(\frac{I_{01}}{I_1}\right) + \gamma_{22}\ln\left(\frac{I_{02}}{I_2}\right) + \gamma_{23}\left(\ln\left(\frac{I_{01}}{I_1}\right)\right)^2 +$$

$$\gamma_{24}\left(\ln\left(\frac{I_{02}}{I_2}\right)\right)^2 + \gamma_{25}\ln\left(\frac{I_{01}}{I_1}\right)\ln\left(\frac{I_{02}}{I_2}\right)$$

The coefficients $\gamma_{11}$ to $\gamma_{25}$ are usually arrived at using fitting methods.

While expressions like Eq. 3, that is, lineas subtraction will be used herein to demonstrate energy subtraction, it will be understood by those skilled in the art that higher order combinations such as Eq. 5 could also be used. Higher order combinations are obtained by further processing of the image data in electronic circuits that perform the mathematical operations.

In general, by properly combining the low and high average X-ray energy images as in Eq. 5, the contribution of materials of a certain average atomic number can be cancelled out or at least suppressed. The choice of the coefficients ($\gamma_{11}$ to $\gamma_{15}$ for example) determines which materials are cancelled. For a given pair of energy different images, many energy subtractions may be generated.

The process of combining the low and high energy image information will be referred to herein as energy subtraction and sometimes merely as subtraction. It should be kept in mind, however, that it is not a simple arithmetic difference.

In one known type of energy subtraction, an X-ray image of a region of interest in the body, is obtained with a nominally low kilovoltage (kV) applied to the X-ray tube so the beam projected through the body has an average spectral distribution within a band having low average energy. Before or after the low energy image is obtained, another image is obtained with a comparatively higher kV applied to the X-ray tube and it has a higher average energy spectral band. Various kinds of image detectors are used to form the low and high energy images. Typically, the low and high energy images are obtained with an X-ray image intensifier tube whose output phosphor is viewed with a video camera. The analog video output signals from the camera are converted to digital picture elements (pixels) corresponding in value to the intensities in brightness of the same elements in the original X-ray images. The digitized images are usually stored in a full-frame memory. Customarily, digital pixel data representative of the low and high energy X-ray images are variously weighted so that when the data are subtracted the resulting difference image suppresses visualization of materials lying within a certain atomic number range. In this way soft tissue structures can be subtracted out when the image information of interest is an underlying or overlying blood vessel containing an iodinated X-ray contrast agent. In other applications, the distracting effects of bony structures may be subtracted out to allow better visualization of soft tissue masses such as in the lungs. The digitally expressed pixels composing the difference image are usually converted to analog video signals and used to drive a television monitor that displays the difference image. In these subtraction procedures, it is very important that the images at the different average X-ray energies be acquired as close together in time as possible so that no mis-registration artifacts are generated or appear in the subtracted image.

A typical system for subtracting X-ray images obtained with different X-ray energies is described in Georges et al., U.S. Pat. No. 4,355,331.

Presently available systems that do energy subtraction are generally complex and ordinarily it is not practical to adapt them to existing conventional diagnostic X-ray systems. Moreover, prior image subtraction systems require a specialized X-ray tube power supply that has the capability of switching the kilovoltage applied to the X-ray tube between low and high kV levels at a rapid rare in order to obtain the low average photon energy and high average photon energy X-ray beams in quick enough succession to obviate the ill effects of patient movement. An X-ray tube power supply and control for switching the X-ray tube between high and low energy output states is described in Daniels et al., U.S. Pat. No. 4,361,901. The two cited patents are assigned to the assignee of this application.

There is a need for a system that permits subtraction of X-ray images but which obviates the need for an expensive electronic image receptor and instead uses radiographic film images formed with different X-ray energies. Such a system could be adapted to existing diagnostic X-ray apparatus wherein single radiographic exposures are made with the use of a relatively broad X-ray spectrum and a cassette that contains the film and the intensifying screens. Generally, in ordinary radiography the light-proof cassette has one intensifying screen fixed in its body and another screen attached to the cover of the cassette. Film having a photographic emulsion on both sides is inserted between the screens before the cover of the cassette is closed. When the X-ray exposure is made, the intensifying screens luminesce so that the light from them exposes the film. The intensifying screen that is first penetrated by the X-ray beam that emerges from the body will absorb, typically, a higher fraction of the incident soft or low energy x-ray photons incident on the first screen and a somewhat smaller fraction of the higher energy X-ray photons. This is because lower energy X-rays are more easily stopped. The absorbed X-rays will cause the screen to produce light which will expose the film. While a larger fraction of the light will expose the film emulsion closest to the first or front screen, some crossover of light to the back emulsion will occur. The X-rays that were not absorbed by the front screen will impinge on the second or rear screen. Because of the natural differential absorption of the front screen, the X-rays absorbed by the rear screen will have a higher average energy than those absorbed by the front screen. The X-rays absorbed by the rear screen will excite it to produce light an expose the film emulsion, primarily, the back emulsion in this case. Thus, in a sense, two coincident X-ray exposures are made on a single film wherein each of the intensifying screens and emulsions has been excited by X-radiation at different average energies. However, the energy information is lost because it has been distributed between the two film emulsions in an uncontrolled manner.

The scheme just described is meritorious insofar as obtaining perfect registration between the low and high energy images is concerned since the images are made during the same exposure.

However, since the dual energy images are superimposed on the film they cannot be read out independently with a transmission or reflected light beam and detector system. Reading out the images separately is necessary in order to permit weighting of at least one set of image data and the cancellation or subtraction of image information which only obscures the information of primary interest.

In Alvarez, et al., U.S. Pat. No. 4,029,963, Column 8, beginning at line 42, a scheme is proposed wherein a double emulsion film is exposed between two similar intensifying screens such that the low energy X-ray photons will interact with one screen primarily and the high energy photons, from which a substantial amount of the low energy photons have been filtered out, will interact with the other screen to thereby produce images at slightly different energy levels on each of the emulsions. The patent states that the emulsions are separated from the film substrate and constitute transparencies through which a light beam may be projected in sequence to derive the individual different energy images by viewing the emulsions with a television camera. There is no explanation of how the emulsions can be separated from the film base without destroying them or, at least, losing registration between them.

SUMMARY OF THE INVENTION

Several new approaches to film-based subtraction radiography are disclosed herein. Various embodiments of film packaging arrangements are disclosed which enable obtaining the effects of making exposures at two different X-ray energy spectral bands using a single conventional polyenergetic or broad spectral band X-ray beam such as is used in standard radiography. The new film packaging arrangement can be used in or easily retrofit to existing conventional radiographic apparatus.

In accordance with one of the several embodiments of the invention, the effect of obtaining two images at different X-ray energy or spectral bands is obtained primarily by using grids with intensifying screens to encode or differentiate images obtained with two different parts of the X-ray spectrum. Various kinds of film packages are proposed for cooperating with the intensifying screens. The film packages can be used in X-ray film cassettes having external dimensions or sizes that have been standardized for use in conventional radiographic apparatus. The intensifying screens, in accordance with the invention, can be similar, at least insofar as their size and thickness is concerned, to intensifying screens that are customarily fastened to the cover and body of a standard radiographic cassette wherein they perform the function of converting X-radiation to light to augment exposure of the film emulsion or emulsions.

Another film package embodiment comprises two radiographic films joined together on at least two corresponding edges to thereby form a pocket. The joined films are between the front and rear intensifying screens in a cassette during exposure to the polyenergetic X-ray beam that emerges from the body. At this time there is a planar insert in the pocket between the films. The insert is opaque to light but may also contain an X-ray filter material for accentuating the differences in the X-ray energies between the front and rear screens. After the films are developed, a light reflective insert may be placed in the pocket to permit independent readout or decoding of the images on the two films.

Another film package embodiment comprises a laminated structure that is disposed between front and rear intensifying screen layers. There is a planar double-sided reflective sheet or substrate in the center of the package and an opaque coating on each reflective surface. The front and back film emulsions are deposited on the opaque surfaces and these emulsions interface with the front and rear intensifying screens. After development of the film to remove the opaque coating or convert them to transparencies, the different energy images in the respective emulsions can be decoded or read out by reflective scanning techniques.

In still another film package embodiment two films are hinged together on corresponding edges and a planar light opaque insert sheet, which may contain X-ray filtering material, is disposed between the congruent or superimposed films during the X-ray exposure while the films are between the intensifying screens in a cassette. The films and insert can be variously notched at their edges for type identification. During exposure, preferably, v-shaped markers are shadowgraphed on the films. The developed films containing the different energy images are swung on their hinge to put them in substantial coplanar relation for readout by scanning the transparencies while they are back-lighted. The markers are used to assure that the scanning line on one film will be on the same line as that on the other film so that picture elements (pixels) that were congruent on the two films during exposure can be matched during readout.

In any of the outlined film package embodiments, the front intensifying screen on which the image is first incident, may preferably contain a material that has a k-absorption edge to thereby enhance selective absorption of relatively high energy X-rays so that the X-rays that go through to the rear screen will contain a higher fraction of low energy X-rays.

All of the film packages disclosed herein are capable of providing an encoded image or a pair of X-ray images obtained by exposing a body to a polyenergetic or broad spectrum X-ray beam and then decoding the images to produce discrete sets of pixel data or frames which can be variously processed and subtracted from each other to produce an image in which the contributions from non-interesting anatomical structures which are within a particular atomic number range are suppressed. For instance, a blood vessel containing an X-ray opaque material might be imaged to the exclusion of surrounding tissue.

Various systems for decoding or reading out the cassette-usable film packages described herein are also proposed and constitute separate inventions.

Various embodiments of the film packages and readout or decoding apparatus will now be described in detail in reference to the drawings.

DESCRIPTION OF PREFERRED EMBODIMENTS

Figures 1, 2:
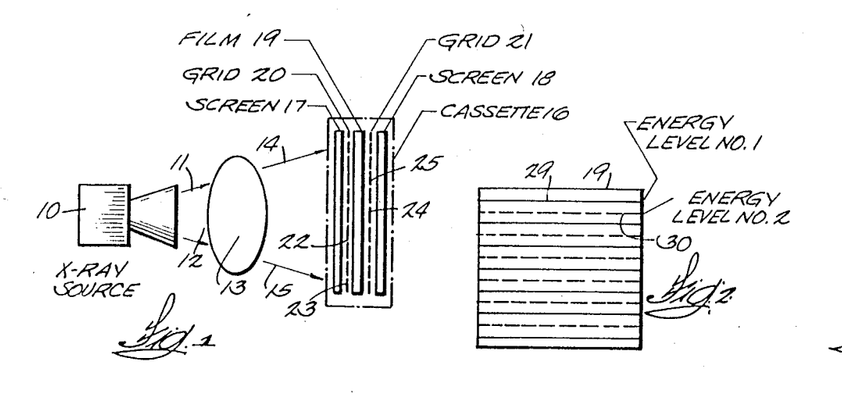
FIG. 1 is a diagram of an X-ray source and a body in conjunction with a diagram of one of the new film packages.
FIG. 2 is a diagram of a film that is used for explaining the nature of the information that is encoded on it, using the type, of film package exhibited in FIG. 1.

FIG. 1 shows a diagram of an X-ray source 10 that projects a diverging X-ray beam whose boundaries are marked 11 and 12 through a body 13 that is represented by an ellipse and is undergoing X-ray examination. The boundaries of the beam that emerges from the body are marked 14 and 15. For radiography, the peak energy X-ray photons in the beam are typically between 20 and 150 kiloelectron volts but in any case the primary beam will be polyenergetic or have a broad energy spectrum. The emergent X-ray beam, which has been differentially attenuated over its area by having passed through body layers of different density and atomic number distributions, falls on a cassette that is represented by a dashed-dot line rectangle and is marked 16. In cassette 16 of FIG. 1 there are two X-ray image intensifying screens 17 and 18 which can be permanently fixed in the cassette. A radiographic film 19 which has photographic emulsion on both faces is disposed between luminescent intensifying screens 17 and 18. Grid 20 is interposed between the emulsion on one side of film 19 and intensifying screen 17 and another grid 21 is interposed between the other side of film 19 and intensifying screen 18. These grids should not be confused with X-ray scatter inhibiting grids such as Bucky grids which are customarily interposed between the body being radiographed and the film cassette to intercept X-radiation that is scattered laterally as the X-ray beam passes through the body. The grids 20 and 21 are more like optical gratings although they do not have as many lines per unit length as optical gratings. Grids 20 and 21 are faced with a plurality of parallel lines which are alternately opaque and light transmissive and are arranged with a constant periodicity. Grid 20 has light transmitting lines 22 parallel to opaque or light-stopping lines 23. Similarly, grid 21 has light transmitting lines or openings 24 and opaque lines 25. The width of the opaque lines in each grid is greater than or equal to the width of the light transmitting lines. The light transmitting lines in grid 20 are aligned with the light opaque lines of grid 21 and vice versa. Consequently, the opaque lines of grid 20 are aligned with the light transmissive lines of grid 21. Both grids have the same periodicity. The grids may be inscribed in individual thin sheets of a material such as "Mylar" sheets but they may also be printed on the surfaces of the intensifying screens 17 and 18 which face toward film 19. By printing the grids on the intensifying screens 17 and 18, it is possible to get the screens into closest contact with the film which is desirable in order to avoid lateral diffusion of the light which would adversely affect image resolution. The width of the open lines and opaque lines on the grid are preferable in the range of 50 to 100 microns. Although a double emulsion film 19 is preferred, two juxtaposed and oppositely faced emulsions on individual film bases could be used.

The intensifying screens 17 and 18 and the FIG. 1 film package need not be separate from each other. They may be hinged together to form a folio between which the film 19 is inserted and then the screen and film sandwich may be inserted in a cassette that has no screens fixed in it.

Figures 3, 6:
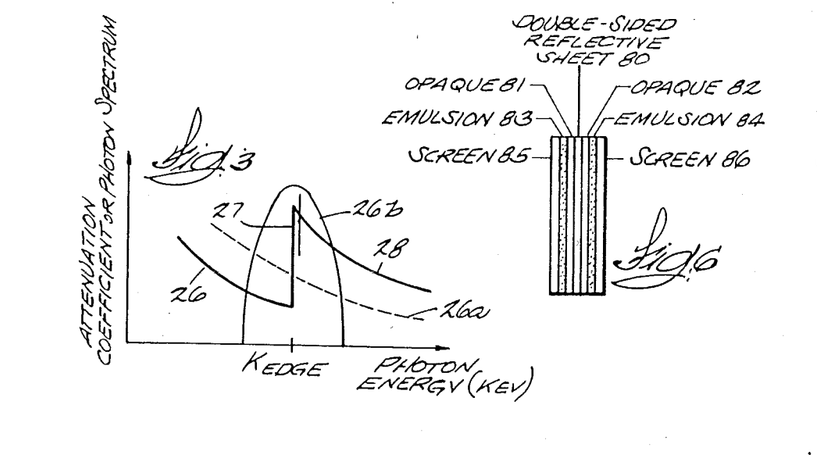
FIG. 3 is a graph for showing in a typical case how the X-ray attenuation coefficients for a body vary in correspondence pondence with X-ray photon energy.
FIG. 6 is another new type of film package for performing dual energy image subtraction.

Generally, as a polyenergetic X-ray beam passes through an object, the lower energy photons are attenuated or absorbed more rapidly than the higher energy photons. This is because in the energy range of common polyenergetic diagnostic X-ray beams the attenuation coefficient of most common substances decreases with increasing energy. This energy dependence is shown by the curve labeled 26a in FIG. 3. If an X-ray beam with a spectrum like that shown by the curve labeled 26b in FIG. 3 is incident on the front intensifying screen of a cassette and the energy dependence of X-ray attenuation in the front screen in this energy range is similar to that shown in curve 26a, and the thickness of the screen is not sufficient to absorb the majority of the X-rays, then the spectrum detected by this front screen will be somewhat of a lower average energy than the incident spectrum. Conversely, the spectrum of photons that are not absorbed and, therefore, incident on the rear screen will have a higher average energy than the incident spectrum. For a dual energy application, the rear screen should absorb a large fraction of the X-rays transmitted through the front screen. Thus, one may see that the energy dependence of absorption by the front screen has served as a filter and has caused the spectra detected by the front and back screens to differ somewhat. With an energy dependence similar to 26a the spectrum detected by the front screen is of lower average energy than that detected by the rear screen. If the luminescence of the two intensifying screens can be recorded and read out in a manner that they can be separated, for example by the device of FIG. 1, then energy subtraction can be employed to remove unwanted structures.

The quality of the resulting energy subtracted image depends, in part, on the degree to which the X-ray spectra detected differ. Image quality improvement can result if the spectra can be separated more. One possible way to accomplish this is to use a material for the front screen that has a K-absorption edge, hereafter sometimes called a K-edge that is well within the broad energy spectrum of the X-ray beam. The K-edge energy of an element depends on its atomic number and is equal to the binding energy of the K-shell electrons. For example, the K-edge is at 33.17 kiloelectron volts (Kev) for iodine at 50.24 Kev for gadolinium, and at 69.525 Kev for tungsten. X-ray photons whose energy is just higher than the K-edge of a material experience significantly higher attenuation than those whose energy is just below the K-edge. This is because photoeletric interaction is very likely between K-electrons and X-ray photons whose energy is just higher than the K-edge, whereas it is forbidden for photons whose energy is below the K-edge. This increase in attenuation is indicated by the vertical line 27 in FIG. 3. On either side of the K-edge the attenuation decreases as energy increases as shown by lines 26 an 28 in FIG. 3.

Now consider the system in FIG. 1 wherein the front screen is made of a material with a K-edge near the middle of the spectrum and wherein the thickness of the screen is chosen so that photons whose energy is above the K-edge are mostly absorbed while a substantial fraction of the photons whose energy is below the K-edge is transmitted. The X-rays not absorbed by the front screen will continue for the most part through grid 20, film 19 and grid 21 and will impinge on rear intensifying screen 18. Screen 18 is preferably chosen to be of composition and thickness to absorb a relatively high fraction of the lower energy photons but a smaller fraction of the higher energy photons. In this way the front screen will absorb photons whose average energy is higher than the average energy of the photons detected in the rear screen.

Thus, by using the novel concept described above, better separation can result between the lower energy spectrum, now detected by the rear screen, and the higher energy spectrum, detected by the front screen. It is desirable to have the K-edge of the first or front screen be near the middle of the polyenergetic spectrum of interest. Depending on the polyenergetic X-ray spectrum being used, materials in the atomic number range of 53 to 74 or from iodine to tungsten can be employed. Gadolinium is preferred because it had a well positioned K-edge and screens containing this elemental component are commercially available. The rear screen may be, by way of example and not limitation, a conventional calcium tungstate screen.

The device or film package shown in FIG. 1 will now be described in greater detail. It is to be understood that this device can be constructed using the K-edge concept described above in which the higher energy photons are absorbed in the front screen or with the conventional scheme of absorbing the lower energy photons in the front screen. When developed film 19 will contain a series of image information lines alternating between lines produced by the front screen 17 acting through grid 20 and lines produced by the rear screen 18 acting through grid 21.

Double emulsion films of various types are available commercially. The preferred type has a light opaque coating on the film substrate underlying the emulsion. This coating is dissolved away or at least becomes light transparent when the film is developed. However, even in the absence of such opaque coating, the light emitted by rear screen 18 that forms the image on the rear side of the film 19 would not obliterate the grid pattern on the front side of the film because the transparent lines of the front grid 20 are aligned with the opaque lines of the rear grid 21 and vice versa. The film is, of course, developed by known photographic development methods before it is decoded or read out to produce the independent images corresponding to the spectra detected by the front and rear screens. The information containing grid lines on each side of the film will, of course, not be coincident with each other since the opaque lines on one side will be offset by about one line space from the lines on the other side, but they will be close enough to be unresolvable by human eyes. Insofar as readout or decoding is concerned, it makes no difference that the alternate lines on each side of the film contain image information corresponding respectively to low and high average energy X-ray spectra. The low and high energy images can be read out separately with devices that will be described later. When these separate images are derived, the data representing them can be processed to produce the energy difference images that are being sought.

By using grids that have a line width of 50 to 100 microns or so, it is possible to achieve a spatial resolution of 0.25 mm. Ideally, the spacing of the grid lines should be smaller than the spatial resolution of the intensifying screens. In such case, no information contained in the optical image emerging from the intensifying screens will be lost.

The exposed lines on the opposite sides of film 19 are so close together as a result of the close grid spacing that any points aligned on the adjacent low and high energy lines will be from almost the same volume or pixel area although one will be representative of the low energy response and the other of the high energy X-ray response. Since the relative location of the grid lines for the low and high energy images are known, the small spatial translation between them can be easily corrected using conventional interpolation methods. Since the lines are closer than the resolving power of the intensifying screens, the resulting images will not demonstrate a loss of resolution.

Figures 4, 5:
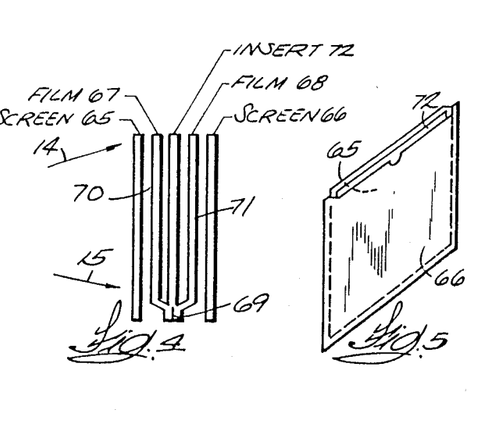
FIG. 4 shows another new type of film package and cooperating X-ray intensifying screens for achieving a difference image from ostensible dual energy X-ray images.
FIG. 5 is a perspective view of the film package isolated from the screen and package combination depicted in FIG. 4.

Before describing the method and apparatus for decoding or reading out the gridded type of film described in connection with FIGS. 1 and 2, an alternative embodiment of a film package will be described that also permits acquiring separate images at different average X-ray energies simultaneously for later mathematical processing. The first alternative embodiment is illustrated in FIGS. 4 and 5. FIG. 4 shows an exploded view of the package. In this case the film package is used as in the FIG. 1 embodiment in a cassette having one luminescent intensifying screen 65 that is comparable to screen 17 in FIG. 1. Intensifying screen 65 may contain a compound having an element whose K-edge corresponds to an X-ray energy of a little more than 50 kiloelectron volts, by way of example, but, again, it is not absolutely necessary that the energy separation be due to the presence of a K-edge. The rear intensifying screen 66 in the FIG. 4 embodiment may be a conventional calcium tungstate screen similar to screen 18 in the FIG. 1 embodiment. The FIG. 4 film package is comprised of two single emulsion films 67 and 68 which are adhered at least two of their edges 69 to form a pocket. The pocket is exhibited in FIG. 5. The seal at the lowermost edge of 69 of the two films 67 and 68 is visible in FIG. 4. The outside surface 70 of front film 67 has the photosensitive emulsion on it. The rear surface 71 of rear film 68 has a photosensitive emulsion on it. One of the photosensitive films may have an H/D curve that differs from the other. As is known, this curve is a plot of the film density versus the logarithm of X-ray intensity. A film that has an H/D curve that best matches the intensifying screen that is used to excite it will be selected. For the FIG. 4 and 5 film package, film that does not have the opaque coating under the emulsion can be used although that which has the opaque coating may also be used. The pocket allows for installing an X-ray transmissive but optically opaque planar insert 72 between films 67 and 68. Insert 72 may be installed during package fabrication, but in any case before the film package is deposited in a cassette between a pair of image intensifying screens 65 and 66. If films having an opaque coating between their substrate and photosensitive emulsion are used, light opaque insert 72 may not be necessary. Sheet 72 may or may not be optically reflective. When the cassette is exposed to a broad spectrum or polyenergetic X-ray beam that is differentially attenuated by part of the anatomy, the attenuation properties and orientation of the intensifying screens 65 and 66 will result in recording the images of different average energies on the front and rear emulsions 70 and 71 of the film package. Luminescense of the front screen 65 exposes film 67 while luminescence of the rear screen results in exposure of rear film 68. There is no cross-talk between the two film screens because of opaque insert 72 or the aforementioned opaque coating within the film base being present. Thus, after X-ray exposure, the open-sided pocket or envelope comprised of films 67 and 68 are removed from the cassette with the opaque insert 72 still present between the films. Insert 72 may then be removed from between the films and the films can be developed by customary photographic methods. Upon development, the image corresponding to the spectrum detected by the front screen appears on the emulsion surface 70 of front film 67 and the image corresponding to the spectrum detected by the rear screen appears on the emulsion surface 71 of rear film 68. The films 65 and 66 remain adhered at their edges as illustrated in FIG. 5 so they still form a pocket which assures that the information on the two films will remain in registration when they are being read out or decoded. Later apparatus will be described for decoding the films while they remain coincident in pocket form. The decoding method for the FIGS. 4 and 5 film package differs from that used to decode the film package of FIGS. 1 and 2 since no grids are used in the FIGS. 4 and 5 embodiment.

For readout or decoding of the films in pocket form, a highly light reflective insert 72 is substituted for the original light opaque insert 72. Because the two films 67 and 68 are bonded together, pixels derived from high and low energy X-ray spectra that were coincident during the X-ray exposure will remain positively coincident after exposure and development of the film. Then, to read out the two images individually, the reflective insert is put in place, and the two films are optically scanned, as will be further described when one of the readout system embodiments is described later. By using the reflective insert between the films, the scanning readout beams can be acting on corresponding pixels on opposite films at the same time without cross-talk and perfect registration can be maintained between corresponding low and high energy pixels on the individual films. The insert 72 is desirably a sheet of film that has been aluminized on both sides by vapor deposition of aluminum.

An advantage of using an insert 72' that is light reflective is that a higher fraction of the light produced by the intensifying screens will be used. A disadvantage is that multiple reflection of light between the reflective sheet and the film image will reduce sharpness. However, if one uses film of the type having an opaque coating under the emulsion which is dissolved out when the emulsion is developed, feedback from the reflective surface through the film to the intensifier screen can be minimized.

A further modification of the opaque insert 72 to be used when a K-edge front screen is used comprises a plastic sheet that has been coated with a compound containing an element such as gadolinium or, preferably, an element that has a slightly higher K-absorption edge than the K-absorption edge in the front intensifying screen 65. Filter materials containing hafnium (atomic No. 72), tantalum (atomic No. 73), or tungsten (atomic No. 74), can be used, by way of examples. The higher atomic number elements present in insert 72 can serve to filter out more of the high energy part of the spectrum above the K-edge 27 in FIG. 3 to thereby provide a higher proportion of low energy photons for exciting the rear intensifier screen 66 in FIG. 4. Of course, when a coating of X-ray filtering material is used on insert 72, the opaque coating may be simply deposited over the filter material. If the front intensifying screen 65 is used which does not have a K-edge in the FIG. 4 film package, then an X-ray beam hardening material such as copper can be incorporated in insert 72. By using such filter, the front intensifying screen 65 will be excited by a relatively broad spectral band and will filter out or attenuate some of the low energy or soft radiation and will transmit much of the high energy radiation. The copper filter will then remove more of the soft radiation so that the rear screen 66 will be excited by predominantly harder or more energetic radiation when the images of differrent energies are recorded on the respective films.

It should be recognized that in FIG. 4 the intensifying screens 65 and 66 and the films and insert appear to be separated from each other. This is only for the sake of making the screen, film and insert layers easier to visualize. In an actual product, the two films 67 and 68 interface with opposite sides of the insert 72 which fits very tightly between them. When the FIG. 4 film package is installed in a radiographic cassette, the intensifying screens 65 and 66 are pressed tightly against the emulsion sides of the films so there are no significant gaps between the screens and film. In FIG. 4 as well as in the FIG. 1 embodiment, the layers of the film package and the intensifying screens are pressed tightly against each other.

After an X-ray exposure is made with the FIG. 4 embodiment, the film package comprised of films 67 and 68 and insert 72 is removed from the cassette and developed by ordinary photographic developing methods. After development, the films are ready for readout or decoding to obtain data representative of the individual low and high energy X-ray images such that the data may be processed to obtain one or more energy difference images.

An alternative type of film package for achieving isolated low and high X-ray energy spectral band images is depicted in FIG. 6. This is a fully laminated film package. The package is comprised of a central substrate consisting of a plastic sheet 80 that has a reflective metal coating on each of its faces. The sheet 80 may also serve as a substrate for a coating of X-ray filter material. A coating of opaque material of the type that becomes transparent after film development is applied over the two reflective surfaces. The opaque coatings are identified by the numerals 81 and 82. The photosensitive emulsion coatings 83 and 84 are deposited over opaque coatings 81 and 82 so that emulsions are presented in opposite directions from opposite sides of the coated substrate sheet 80. The composite or laminated film package is comparable in appearance to an ordinary film where an emulsion layer is simply coated on both sides of a substrate sheet 80, opaque coatings 81 and 82, and photosensitive emulsion coatings 83 and 84, can be used in a cassette between a pair of intensifying screens 85 and 86 which, in the FIG. 6 diagram, are shown to be pressed against the emulsion sides of the intervening composite film. Intensifying screens 85 and 86, of course, are permanently fixed in the cover and body of standard radiographic cassettes. Intensifying screens 85 and 86 used with a composite film in the FIG. 6 embodiment could be the same as the intensifying screens used in the FIG. 1 and 2 and FIG. 4 embodiments thus far described. This package could optionally be made without the opaque coatings 81 and 82. The disadvantage, again, is a possible loss of resolution. In the FIG. 6 embodiment, at least the front intensifying screen 85 on which the X-ray image first impinges may have a K-edge for preferentially attenuating and absorbing high energy radiation for reasons given in connection with previously discussing the other film package embodiments. If the double-sided reflective sheet 80 is coated with filter material, this material may also have a K-edge. Alternatively, screen 85 may be of the type that preferentially absorbs low energy X-rays while reflective sheet 80 may be a beam hardening filter.

After the composite film shown in FIG. 6 has been used to make an X-ray exposure, the film may be developed like any conventional radiographic film. During the developing process the opaque non-crossover coatings 81 and 82 are dissolved out or rendered transparent by the chemicals that act on the emulsions 83 and 84. Thus, after development, the composite film in the FIG. 6 embodiment ends up with images contained in the emulsions 83 and 84 on opposite sides of the substrate and there is a reflective surface between the emulsions since the opaque coatings were removed during film processing. The result is a developed film whose opposite sides contain the low and high energy X-ray image information which can be read out or decoded srmultaneously by apparatus which will be described hereinafter.

Note that the opaque coatings could be left out of the FIG. 6 composite film package if one desires to increase film response speed at the expense of resolution.

Figure 7:
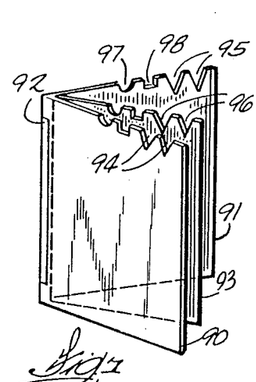
FIG. 7 is a perspective view of another type of film package for performing dual energy image subtraction.

Another type of film package for obtaining separation of X-ray images formed with different X-ray spectral bands is depicted in FIG. 7. In this embodiment, two radiographic films 90 and 91 are held together by a flexible strip 92 which serves as a hinge. The strip is provided with a pressure-sensitive adhesive coating for attaching it to the films. At the time the film package of FIG. 7 is assembled, a thin light opaque and substantially X-ray transmissive sheet 93 is placed between the two hinge films 90 and 91. The films are then brought together similarly to closing the covers of a book to trap the sheet 93 between them. This produces a package that can be inserted in an ordinary radiographic film cassette between the two energy selective intensifying screens as has been previously described. Light opaque sheet 93 may also be a plastic coated with an X-ray filter material that may or may not have a K-edge with the energy range of interest and at least one of the intensifying screens in the cassette may contain a compound having an element which has a K-edge in the energy range of interest. The composite film package or folio depicted in FIG. 7 can be used in a radiographic cassette to make dual energy X-ray images as was the case in the FIG. 1, 4 and 6 embodiments. As in the previously discussed embodiments, the film package shown in FIG. 7 would be disposed in the cassette between a pair of image intensifying screens such as those which have already been discussed. In any case, the intensifying screens in the cassette should be pressed tightly against both sides of the film package. The intensifying screen, not shown in FIG. 7, but contained in the cassette, on which the X-ray beam first impinges, is preferably one that has a K-absorption edge in the energy range of interest.

Again, if a K-edge front screen is used, the X-ray filter material coating on insert 93 in FIG. 7 may also be a compound containing an appropriately positioned K-edge and is therefore operative to filter out more of the high energy part of the spectrum from the X-ray beam after it has passed through the front film 90 and let a proportionately larger part of the low energy spectral band remain to pass through the rear film 91 for exciting the intensifying screen next to it in the film cassette. If the front intensifying screen does not have a K-edge, light opaque insert 93 may be coated with a beam hardening filter material such as copper.

In the FIG. 7 embodiment the films 90 and 91 and insert 93 are provided with congruent notches 94, 95 and 96, respectively. Projections, not shown, which are complementary in shape and position of the notches are provided in the cassette for registering in the notches if it has been pre-ordained that a particular film and insert is compatible with the intensifying screens in the cassette. If the notches in the film and the projections in the cassette cannot be registered, it is an indication that either the cassette should be changed or the film package should be changed to bring about registration and hence indicate compatibility between the intensifying screens and the film package. Encoding the film package with notches or other suitable means, not only has value in preventing mismatches between film types and cassette intensifying screens but it is also useful for locating films in the readout device after the films have been developed.

The films in the FIG. 7 package may also be encoded for allowing determination of the type of film that is being used by inspection. In any case it is necessary to match the radiographic film characteristics with the characteristics of the cooperating intensifying screens that are fixed in the cassette. For film identification before the package is inserted in a cassette, the film is encoded with additional notches such as the semicircular and square notches 97 and 98. In some cases it may be necessary to match the film sensitivity to the light spectrum output of each intensifying screen. In cases where the two screens have different light spectral emissions the orientation of the film cassette is important so that each film faces the appropriate screen.

Figure 8:
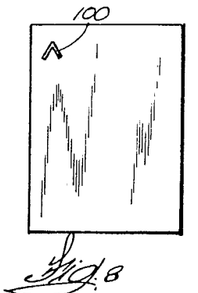
FIG. 8 is a plan view of the front of an X-ray film cassette on which there is an inverted v-shaped index mark that is useful for achieving registration between simultaneously produced but separated low and high X-ray energy images for reading out or decoding the film used in the FIG. 7 film package type, for example.

FIG. 8 depicts one face of a cassette in which the film package of FIG. 7 may be used. On this face, which is presented toward the X-ray source and has the film package behind it in the cassette, there is an inverted v-shaped reference marker 100. The sides of the marker that converge to a point are actually pieces of wire that are composed of a material that is poorly X-ray transmissive such as copper. The v-shaped reference marker is preferably incorporated into the cassette face. When the film package of FIG. 7, for example, is exposed in the cassette, a shadowgraph of the marker will be formed in congruency on the films. After the film package has been developed, processed, and is laid open for readout or decoding, the two shadowgraphs of the markers, 100' and 100" are visible on the film as is evident from inspection of FIG. 11. As will appear later, the readout or decoding device for the laid open films in FIG. 11 uses optical scanning to read out the information from the films by horizontal scanning somewhat similar to a raster pattern. The markers are used to determine whether the coplanar films are skewed from horizontal and they are used to provide information as to how the film folio in FIG. 11 must be adjusted in its holder during readout to assure that the scanning beam will run horizontal and will maintain correspondence between pixels that were congruent with each other before the film package of FIG. 7 was unfolded for readout.

FILM READOUT OR DECODING SYSTEMS

Figures 9, 10:
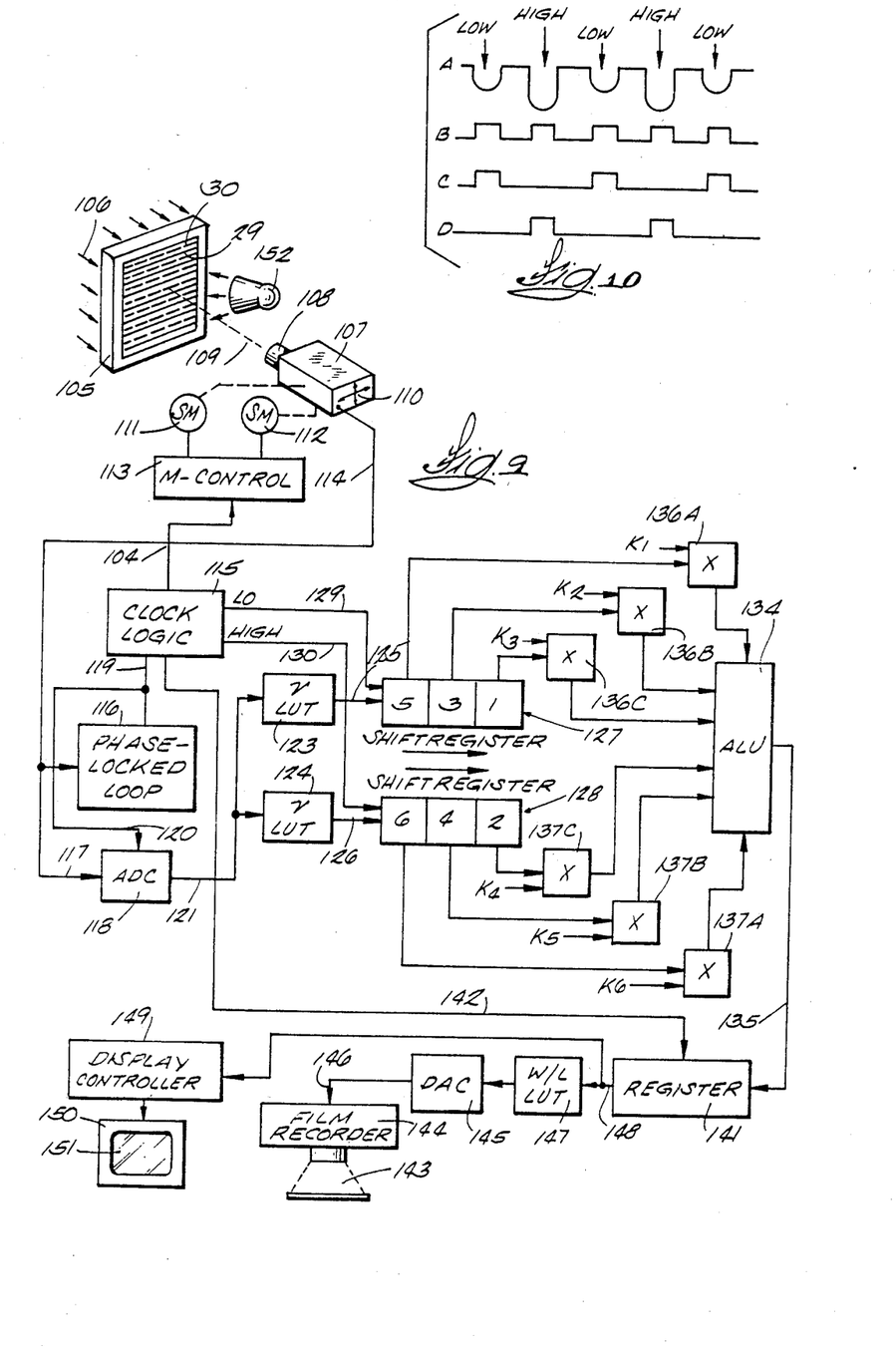
FIG. 9 is a block diagram showing the principal components of a system for reading out or decoding dual X-ray energy film recorded images produced with some film package embodiments described herein.
FIG. 10 is a waveform or timing diagram that is used for explaining one of the characteristics of the decoding system in FIG. 9.

A system for decoding or reading out the low and high energy images such as are acquired with the use of optical grids as in the FIGS. 1 and 2 embodiments is depicted in FIG. 9. Here the developed encoded film is held in front of a light box 105. The light source is not shown but the light rays are projected in the direction of the arrowheaded lines 106 so the encoded film is illuminated from its rear. The grid lines 30 resulting from exposure at one energy are dashed and the grid lines 29 resulting from exposure at the other energy are solid. Because of the transparency of the film, of course, the grid lines on both sides of the film are accessible. A box 107 contains a photosensitive detector, not shown. A tube 108 containing a lens system, not shown, focuses the light transmitted by the film along a line 109 onto the photosensitive detector which produces analog signals representative of the intensity of the spot or pixel that is being examined. As indicated by the crossed arrows 110 the detector box 107 is mounted on a mechanism, not shown, for being moved vertically and horizontally. Recording the intensity of the pixels on the lines 29 and 30 on opposite sides of the film is done in a vertical direction, that is, perpendicularly to the image information containing grid lines. The lens system in tube 108 should have a depth of focus at least equal to the depth or thickness of the film so that the image information on both sides of the film will be in focus simultaneously. Vertical scanning or scanning perpendicularly to the horizontal image information containing lines 29 and 30 may, for example, begin at the top left corner of the film. When a vertical sweep is completed, the detector 107 is shifted horizontally about 0.25 mm and then another vertical scan is made. Although the mechanism for moving the scanning detector 107 vertically and horizontally is not shown, the drive motors for the mechanism are shown. They are stepping motors (SM) represented by the circles marked 111 and 112. The control circuitry for the SM is symbolized by the block marked 113. The motor control 113 causes the motors to be stepped in response to clock signals that are supplied by way of a line 104 leading from clock logic circuitry represented by the block marked 115.

During each vertical scan, an analog signal waveform is output from detector 107 on a line 114. The general characteristics of the analog signals are depicted in part A of FIG. 10. Since there is a small difference in the low energy and high energy image intensities as represented by alternate grid lines 29 and 30, signals of alternating amplitude are derived as is evident from inspection of part A of FIG. 10. This alternating analog signal is fed by way of line 114 to a phase-locked loop symbolized by the block marked 116. The analog signals are also input by way of a line 117 to an analog-to-digital converter (ADC) 118 which contains the usual analog signal sampling circuitry.

The purpose of the phase-locked loop 116 is to generate a sample clock that is used to identify where the low and high signals are placed in the analog signal. The phase-locked loop 116 yields on its output line 119 a square wave pulse train represented in part B of FIG. 10. Pulse signals in part B correspond to the peaks of the low and high energy analog signals. These clock signals are supplied by way of line 120 to ADC 118 so that the latter converts the alternate low and high energy analog signals to corresponding digital values which are output from ADC 118 on a bus 121. Bus 121 leads to the inputs of two gamma lookup tables (LUTs) represented by the blocks 123 and 124. These lookup tables correct for the differences in response of the film to different screen light intensities. Different LUTs are used for the low and high energy signals since different responses may be present, for example, due to the use of different film emulsions. Thus, the LUTs, which are preferably random access memories, store a digital table of gamma correction factors and the digitized signals from ADC 118 constitute addresses to the LUTs. The gamma corrected low energy digital signals are output from LUT 123 on a bus 125. The gamma corrected high energy digital signals are supplied to a shift register 127 which is shown as a three-stage register although another two stages could be used. The high energy digital signals are fed to a shift register 128 which is also shown as a three-stage register.

Gamma corrected digital signals representative of picture element (pixel) intensities and which are output from LUTs 123 and 124 are clocked alternatively into shift registers 127 and 128, respectively. In this embodiment, the low X-ray energy digital pixel signals are fed to shift register 128. Clock logic circuitry 115 divides the pulse signals shown in part B of FIG. 10 into two pulse trains which are shown in parts C and D of FIG. 10. Part C pulses in FIG. 10 are output on line 129 from clock logic 115. The alternate pulse train shown in part D of FIG. 10 is output on line 130. These signals enable shift registers 127 and 128 to write incoming digital pixel signals. Also, for every enabling signal, the digital data is shifted by one stage in the shift registers.

Because the scanner 107 is scanning vertically, and crossing alternate image information lines, alternate low and high intensity pixel signals will be supplied to shift registers 127 and 128, respectively. Assuming that a vertical scan is beginning on a top low X-ray energy line 30 (shown dashed) on the film, the first digital pixel signal will be entered into the stage of shift register 127 which is presently marked 5. When the next low energy line 30 is encountered, the digital signal representing the intensity at the point will go into the first stage of shift register 127 and the first data will be shifted to the second or middle stage of this shift register. While the next low energy line 30 on the film is being scanned, the pixel data will go into the first stage of shift register 127 and the pixel data for the two preceding lines will shift to the right. This process is repeated as scanning proceeds vertically of the film. Every time a new low energy line is crossed, there is a right shift in shift register 127. So, in this embodiment the data for three pixels, a center one and ones above and below it, are always in the shift register.

All of the lines 29 (shown solid) on the film are the result of the high X-ray energy exposure. The pixel data for the high energy lines are supplied alternately to the first stage of shift register 128 and are right shifted so there are always data for three pixels in shift register 128. The reason for making three low and high energy pixel signals available at all times is to permit interpolation. Interpolation is necessary to account for the fact that low and high energy exposure lines 29 and 30 are not coincident with each other on the film but are shifted by one grid line spacing. Energy subtraction is basically a process requiring subtraction of coincident low and high energy pixels. Interpolation amounts to a weighted summation process wherein the low energy and high energy pixels are shifted toward each other.

For example, each can be shifted by half the distance between high and low energy lines before the low and high energy pixel signals are subtracted.

At any moment during a scan, there are three low energy and three high energy pixels available in shift registers 127 and 128, respectively. The object is to obtain weighted sum of the six pixels to obtain a single energy difference pixel which will be output on a bus 135 from an arithmetic logic unit (ALU) represented by the block marked 134. Actually what is done is that a composite low energy pixel and composite high energy pixel is created and a weighted combination of the composite low energy pixel and the high energy pixel is produced to yield one energy difference pixel at a time. The recombinations as well as the subtraction steps are performed in ALU 134.

To obtain proper or interpolated low energy composite signals, $L_c$, and high energy composite signals, $H_c$, for subtraction to produce an energy difference signal for pixel D, it is necessary to weight or multiply the individual pixel signals in the respective shift registers by spatial weighting or recombination factors $K_1$ to $K_6$ some of which may be negative. The weight factors for the energy subtraction are also contained in the coefficients $K_1$ to $K_6$. Thus, in FIG. 9, two groups of multipliers 136A, B, C and 137A, B, C are provided. Considering shift register 127, the first, third and fifth pixels in the vertical scan line (i.e. low energy pixels) are presently in shift register 127. At this moment, these data are multiplied simultaneously by recombination coefficients $K_1$, $K_2$ and $K_3$ in multipliers 136A, 136B and 136C and the results are entered into ALU134. The high energy signals from the even numbered lines on the film in the shift register 128 are multiplied by recombination coefficients $K_4$, $K_5$ and $K_6$ in multipliers 137A, 137B and 137C and the resulting high energy combined pixel signal is entered into ALU134. Simultaneously, the combined low energy signal is subtracted from the high energy signal and the resulting energy difference pixel signal is output on line 135 of ALU134. The weighted spatial shifting process expressed mathematically is as follows:

$$L_c = K_3 L_1 + K_2 L_3 + K_1 L_5$$

$$H_c = K_4 H_2 + K_5 H_4 + K_6 H_6$$

$$H_c - L_c = D$$

As mentioned earlier, every time a low and high energy pixel is entered into shift registers 127 and 128, respectively, the pixel data that was entered earliest in the registers is shifted out and a new set of three combinations is produced and another energy difference pixel signal, D, is yielded on output bus 135 in FIG. 9. The processor in FIG. 9 can thus perform a linear energy subtraction as described in Equation 3. If it is desired to use a higher order expression, for example, in accordance with Equation 5, additional components would be required and should be obvious to those skilled in the art. In any case, as a result of the processing performed on the composite low and high energy pixels, a difference pixel, D, is produced.

The energy difference pixels, D, are inserted in a data latch or register symbolized by the block marked 141. Block logic circuitry 115 provides clocking signals to register 141 by way of line 142. This clock signal rate is one half of the rate at which pixel signals are clocked into the shift registers. Thus, data latch or register 141 is clocked to output signals at a rate which allows sufficient time for two recombination signals to be developed and subtracted. Without this latching, the data for any pixel coming out of ALU134 could be incomplete or inaccurate.

An image frame is recorded on photographic film 143. Any of a number of known types of film recorders 144 may be used. For instance, the film recorder 144 may be based on scanning a light beam in a raster pattern over film 143 and modulating the intensity of the light beam in accordance with the magnitude of the pixel signal values that are output from register 141. The film recorder 144 is considered to be modulated by analog signals in this case and so a digital-to-analog converter (DAC) 145 is provided. The analog signal from DAC 145 is supplied to the film recorder by way of a line 146. Another LUT 147 is interposed between register 141 and DAC 145. It has the legend W/L LUT standing for window/level LUT. The transfer function of LUT 147 is such that the range of difference pixel signals of interest coming in on bus 148 from register 141 are matched to the dynamic range of the film recorder and, hence, the dynamic range of the film. LUT 147 may be a random access memory containing a table of digital values and the digital pixel signals from the register constitute addresses to the LUT.

The scanning system described in reference to FIG. 9 produces images on recording film 143 in which materials in the body that attenuate X-rays at different energy levels differently can be better differentiated. 2000×2000 pixel resolution can be easily obtained with a relatively slow scanning scheme described in connection with FIG. 9.

A video or television type display could be used in addition to or instead of a film recorder. To do this the digital signal output from register 144 is fed to a display controller 149 of a well known type that has a memory large enough to store all of the pixel signals, D, for an entire image. When the image readout and difference processing is complete, the display controller will have a complete image and will refresh the television monitor 150 at standard video rates so that the image will be visible on television screen 151.

In the FIG. 9 embodiment the light rays 106 are projected through the film to permit scanning or reading out of the different intensity raster or grid lines with detector system 107. It will be understood, however, that the film could be illuminated from the front and read out in a reflective mode. Thus, as an alternative, a light source 152 may be used for flooding the film with light. Because the film base is transparent, it is still possible to read out the lines on both of its faces.

Figure 11:
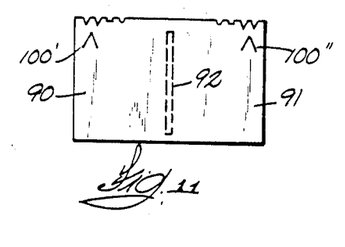
FIG. 11 is a view of the folio type film package exhibited in FIG. 7 when the folio is opened or laid flat.
Figure 13:
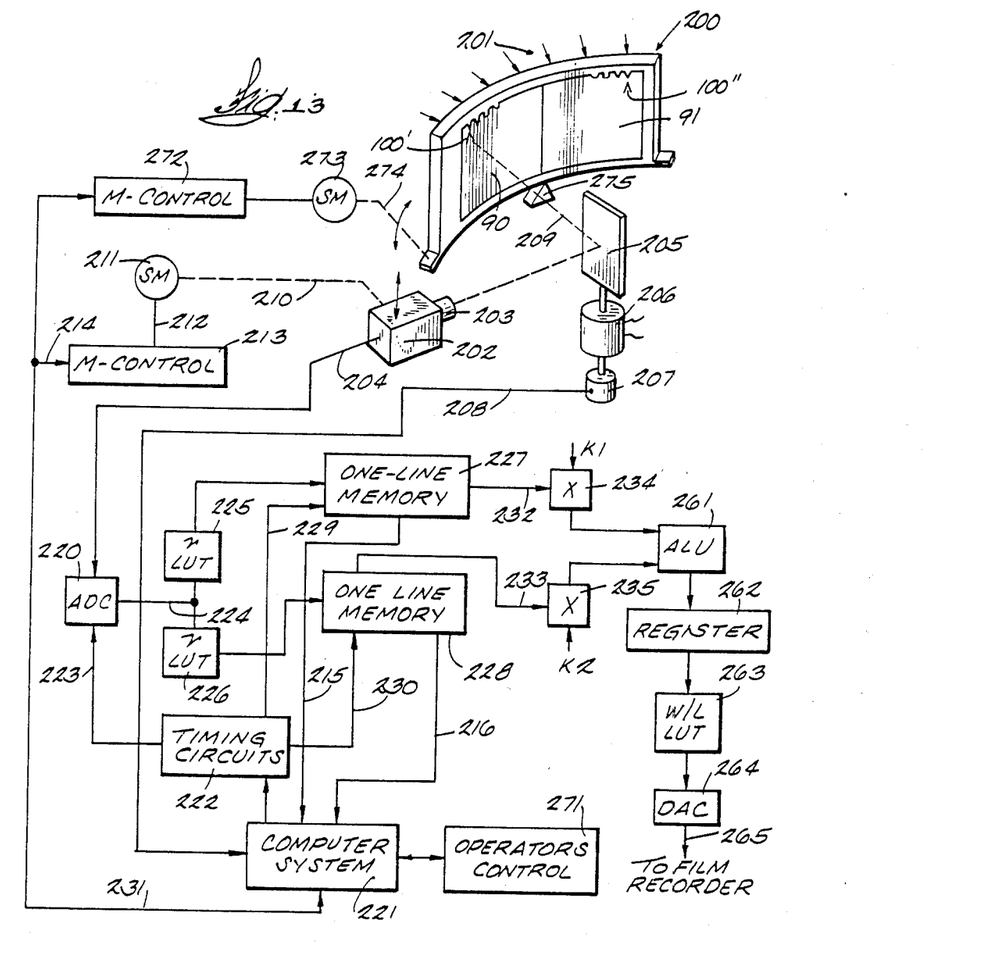
FIG. 13 is a block diagram containing the essential components for a system that reads out or decodes dual energy images that are produced by using certain of the film packages herein.

The FIG. 13 system is also for reading out or decoding radiographic films that have been exposed simultaneously with X-rays having different energy levels. For instance, the FIG. 13 system is suitable for decoding films that have been produced with a film package such as one that was previously discussed and is depicted in FIG. 7. In this case the low and high energy exposure films are joined with a hinge 92 such that they may be unfolded and laid out next to each other as in FIG. 11. The low and high energy films 90 and 91 in FIG. 11 are assumed to be developed and fixed before decoding is undertaken. For decoding, the films 90 and 91 are mounted in a holder 200 in FIG. 13. Note that the two inverted v-shaped reference markers 100′ and 100″ are now shadowgraphs on films 90 and 91. These reference markers will be used to assure that the films are perfectly horizontal when they are mounted in film holder 200 for decoding. How this is done will be explained in detail subsequently.

In the FIG. 13 system, the films 90 and 91 are read out as transparencies. In other words, there is a light source, not shown, behind the film and its emitted rays are represented by the arrows marked 201. A light detector device 202 is used for reading out the intensities of the pixels in conjunction with horizontal scanning of films 90 and 91. Detector device 202 is comparable to detector device 107 in the FIG. 9 readout system. Readout device 202 in FIG. 13 has a lens system in a tube 203. It focuses a point or picture element on a film onto a photodetector, not shown, which is in the detector device 202 housing. The photodetector analog output signals are input to a preamplifier, not shown, which is also in the housing of photodetector device 202. The analog signals representative of pixel intensities on films 90 and 91 are output on a line 204. A rotating mirror 205 is used for scanning. It is rotated by a motor 206 at a nominally constant but not necessarily absolutely constant speed of about 10,000 rpm., for example. An encoder 207 on the same shaft as the mirror, produces clock pulses corresponding in time to the rotational angle of the mirror 205. The encoder pulse train is output from encoder 207 on a line marked 208. As mirror 205 rotates, it reflects a ray 209 emanating from the film to the detector device 202. Since the mirror rotates about a vertical axis, films 90 and 91 are scanned horizontally line-by-line. During the time that mirror 205 is rotating through an angle outside of the film scanning range, the detector 202 is indexed one scan line down the film for another horizontal scan. The mechanism for moving detector 202 vertically so the whole film can be scanned is symbolized by the dashed line 210. The mechanism is powered with a stepping motor 211. The stepping motor is provided with electric power by way of a cable 212 which is output from a motor control unit 213. The motor control unit receives synchronizing pulses by way of a cable 214. The source of these control pulses will be discussed later. It is only necessary to recognize at this time that stepping motor 211 is controlled in such manner that detector 202 be driven vertically in steps so that the full height of both films 90 and 91 will be subjected to horizontal scanning.

The analog signals that are output on line 204 from detector 202 and whose magnitudes correspond to pixel intensities on the film are input to an analog-to-digital converter (ADC) 220. The timing pulses from encoder 207 are supplied by way of line 208 to a processor which is represented by a block that is marked 221 and is labeled as a computer system. One output from computer system 221 is a pulse train that is variously divided in some timing circuits represented by the block marked 222. One timing pulse train that is output from the timing circuits is supplied by way of a line 223 to ADC 220. Thus, the timing is such that when a line on the low energy film 90 is being scanned, the resulting analog signals are continuously converted to corresponding digital signals or pixel values. Conversion continues as the same horizontal line on the adjacent high energy film 91 is scanned. The digitized pixel values are output from ADC 220 on a bus 224. This bus connects to the inputs of two gamma correction look-up tables (LUTs) which are comparable in function to LUTs 123 and 124 in FIG. 9 as has been previously explained. The outputs of LUTs 225 and 226 are coupled to the inputs of two one-line memories 227 and 228, respectively. Memory 227, for example, can store the pixel data for one line at a time derived from the low energy film 90, and memory 228 will store one corresponding horizontal line derived from the high energy film 91. The timing signal that enables memory 227 to receive one line of data from reading out a line on film 90 is provided from the timing circuits by way of a line 229. There is a similar receive control line 230 for causing a line of data to be written into memory 228 while a line on the high energy film 91 is being scanned. Buses 215 and 216 are for letting the computer count pixels to determine when a line is full. As soon as the horizontal line on film 90 and its counterpart on film 91 are scanned, the computer sends out signals by way of cable 231 to the stepping motor control 213 to bring about indexing of detector 202 to a position for reading out the next lower horizontal line films 90 and 91.

One line memories 227 and 228 are actually large shift registers. Each may have 1,000 stages, for example. Each pixel datum derived from one film is to weighted and a pixel on one film is to be subtracted from a spatially corresponding or coincident pixel on the other film. Consequently a line of pixels from the low energy film and a line at the same horizontal level from the high energy film must be stored in memories 227 and 228, respectively, simultaneously. The memories are read out in reverse directions. That is, the pixel data on the output bus 232 of memory 227 is in the first-in, first-out sequence in which the data were inserted in this memory. The data on the output bus 233 from memory 228 is in reverse order. That is, the last in is the first out. As a result, pixels which were in spatial alignment when the films and 91 were folded during the X-ray exposure will be in temporal and spatial alignment as they are read out from the memories. Looking at it in another way, information which is at the left edge of film 91 before it is unfolded from film 90 appears on the right edge of film 91 when the films are unfolded and mounted in holder 200. Since it is not convenient to read out or scan film 90 from left to right and film 91 from right to left to be able to put the pixel data from each film in the memories in the same order, the same effect can be obtained by reading out the memory or shift register stages in reverse order to obtain spatial alignment.

The pixel signals from memory 227 are supplied to one input of a digital multiplier 234 and corresponding digital pixel signals from memory 228 are supplied to one input of another digital multiplier 235. In multiplier 234, the pixel signals are multiplied by a weighting coefficient $K_1$ and they are multiplied in multiplier 225 by a weighting coefficient $K_2$. The successive corresponding weighted low and high energy pixels are subtracted, one pair at a time. in an arithmetic logic unit (ALU) 261. If there is a need to do interpolation, as will be described shortly, additional components similar to those in the FIG. 9 readout system must be added.

As the pixels for each pair of scan lines are subtracted successively, they are fed from ALU 261 to a register 262 after which the one line of energy difference pixel signals is outputted in sequence to a window/level LUT 263 which corresponds in function to LUT 147 in FIG. 9 as was previously explained. The digital pixel signals are fed into DAC 264 where they are continuously converted to analog signals which are output on line 265 to a film recorder which may be of any suitable type such as recorder 144 which was previously described in connection with FIG. 9. Alternatively or additionally, the digit signals from register 262 or (LUT 147 as in FIG. 9) can be transferred to a display controller memory (such as controller 149 in FIG. 9) from which a television display is refreshed.

Now to be discussed is the matter of assuring that all pixels which were in coincidence with each other on the low and high energy films 90 and 91 during the X-ray exposure and before the films were developed and unfolded will be related to each other when the film is unfolded and readout or decoding is in progress. As previously indicated, when the X-ray exposure is made, the films are in a cassette which has a v-shaped reference marker 100 on it as shown in FIG. 8. The reference marker may be formed with fine wire composed of a metal having high X-ray attenuating properties such as copper. Thus, a substantially white or clear v-shaped reference mark will be formed on the films near the same side edge. When the films are unfolded and laid flat as exhibited in FIG. 11, one of the reference markers 100' will be at the left edge of film 90 and the other 100" will be near the right edge of film 91. As previously explained, films 90 and 91 are then mounted in holder 200 in preparation for readout. Now it is necessary to assure that optical centerline 209 to the mirror remain on the same horizontal line of pixels from one film 90 to the other 91. Any crossover from one horizontal line to the next would preclude identifying corresponding pixels on both films. Spatial and temporal registration must be obtained.

Figure 12:
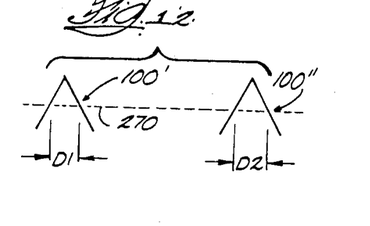
FIG. 12 is an enlargement of the inverted v-shaped reference markers which are used to determine if separated dual energy films are level and register with each other when they are separated as is required in at least one of the readout or decoding systems.

Magnified versions of the reference markers 100' and 100" appear in FIG. 12. Two distances D1 and D2 are indicated. If the scan is properly made on the same horizontal scan line 270, D1 will equal D2. If the film in holder 200 is tilted and, hence, the scan lines are not perfectly horizontal, the values of D1 and D2 will differ.

The microprocessor based computer system 221 being used to control various timing functions in the FIG. 13 decoding system, is also used for determining if D1 and D2 are equal initially and for causing the film holder 200 to rock or tilt until these distances are equal. The first thing that is done in the pixel registration process is for the operator to use the operator's control 271 to indicate to the computer that films 90 and 91 are set up in the holder 200 and that the registration determination process should begin. Rotation of mirror 205 is started at this time. The computer is programmed to cause stepping motor 211 to move the scanning detector downwardly by a known amount so a horizontal line that contains the two reference markers 100' and 100" will be scanned. When this line is scanned, digital pixel data for the line on film 90 will be stored in one-line memory 227 and the data from line on high energy film 91 will be stored in one-line memory 228. The computer is also programmed to detect approximately where the reference markers are relative to the left and right edges of films 90 and 91, respectively. Pixel signals representative of the sides or boundaries of the reference markers are, of course, now stored in memories 227 and 228. The values of the pixels where the horizontal line 270 intersects with boundaries or sides of the reference markers have pixel values close to 0 so it is easy for the computer to identify the pixels at the points of intersection between the horizontal line 270 and the sides of both reference markers. A more precise method of calculating the location of the shadows of the wire is to calculate the center of mass of the shadow of each leg of the v-shaped marker. The computer counts the number of increments in the distances D1 and D2 and compares the counts. If there is a difference between D1 and D2, the computer determines the number of steps through which the film holder 200 must be tilted to bring about equality in D1 and D2. The correction signal is sent out from computer 221 over bus 231 to a motor controller 272 which controls a stepping motor (SM) 273. The mechanism which couples the stepping motor to the film holder 200 is symbolized by the dashed line marked 274. Holder 200 is mounted on a pivot member 275. When computer 221 provides the correction factor to motor controller 272, stepping motor 273 runs in the proper direction and causes the film holder 200 to rock the desired amount. The process is repeated until the scan line is properly aligned.

In addition to assuring that the line readout from film 90 and the line readout from film 91 were overlying each other, lateral alignment or alignment within the line must be assured. That is, the distance of the location of the center of the v-shaped marker shadow in the memory line corresponding to the film 90 from the right end of that memory line must be equal to the corresponding distance for film 91 v-shaped marker from the left end of that memory line. Alignment to the nearest pixel is easily done by proper choice of the clock pulse at which the first data digitization should take place. Finer adjustment can be obtained in one of two ways. In one way, adjustable, selectable delay is applied to the readout pulses so as to obtain this alignment to the desired accuracy. In another way, the residual alignment error is measured and compensated for using interpolation methods. If the interpolation method is used, the proper computational components, that is, shift register and ALU's as in FIG. 9 must be added to the system. The two films 90 and 91 are then scanned to obtain the pixel data for allowing corresponding pixels on films 90 and 91 to be subtracted from each other as previously explained.

Figure 14:
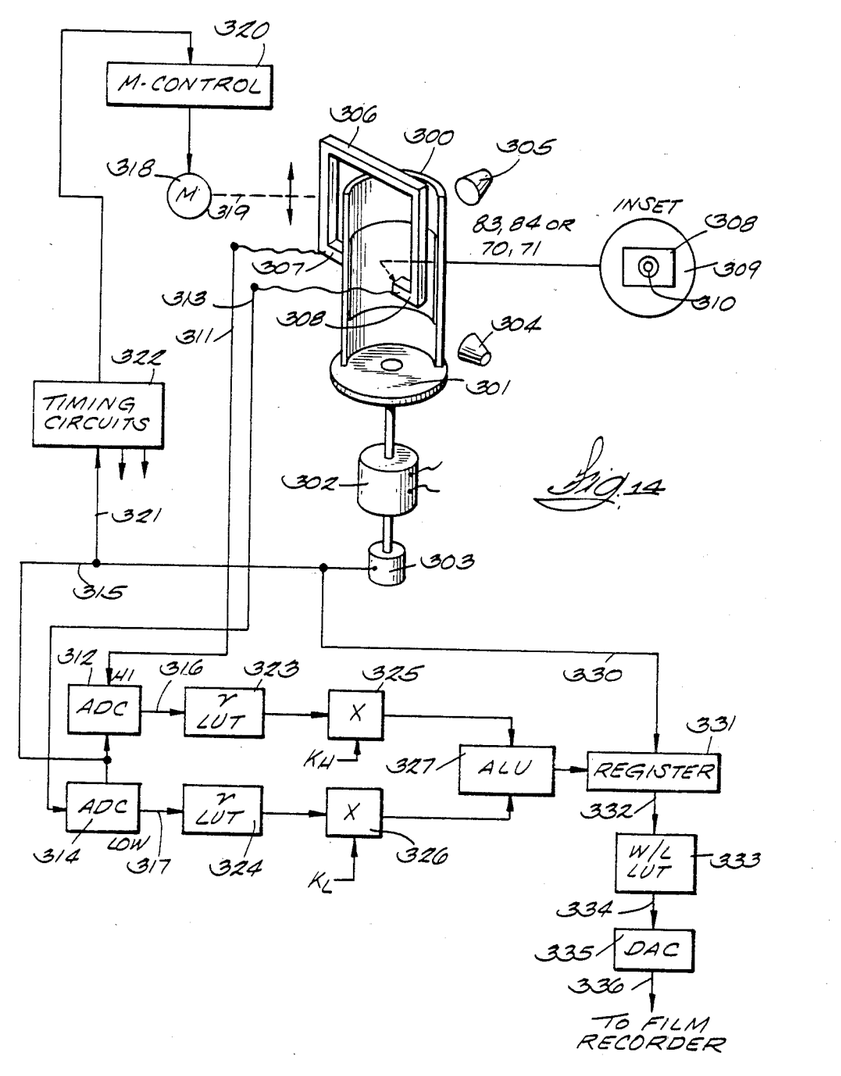
FIG. 14 is a block diagram of another type of system for reading out or decoding dual energy images made with certain of the film packages described herein.

The readout or decoding system for the film packages shown in FIGS. 4 and 5 and FIG. 6 is shown in FIG. 14. Both of these film packages have the high and low X-ray energy films maintained in coincidence with each other and they are read out or decoded while there is a reflective layer or sheet between the films. In FIG. 14, the congruent low and high energy films 83, 84 or 70, 71 are mounted on an essentially semicircular holder 300 which is, in turn, mounted on a circular base 301. The base is supported from the shaft of a motor 302 which may or may not run at exactly constant speed. An encoder 303 is also mounted on the motor shaft and it produces a pulse train indicative of the angular position of the rotating or orbiting films on the holder. Since the films are read out simultaneously in the reflection mode, two light sources 304 and 305 are provided for flooding the congruent films with light from the front and rear. A vertically movable detector arm 306 has extensions 307 and 308 pointing toward the rear and front films. As shown in the inset circle marked 309, the end of typical extension 308 has a lens 310 in its end. The lens focuses light reflected from the film to a photodetector, not shown, behind lens 310. The photodetectors in extensions 307 and 308 yield analog signals whose amplitudes depend on the density of the pixels on the respective films. The analog signals from the detector in extension 307 are supplied by way of line 311 to an input of an ADC 312 and the analog signals from the photodetector in extension 308 are fed by way of a line 313 to the input of another ADC 314. Thus, the analog signals representative of pixel densities from the high energy film are converted to digital signals in ADC 312 and the analog signals from the low energy film are converted to digital pixel signals in ADC 314. The pulse train from the encoder 303 is fed by way of a line 315 to both ADCs 312 and 314. These signals cause ADC 312 and ADC 314 to convert only during the time that the orbiting films are within the scope of the detectors. The digital values of the sequence of pixels along a single horizontal or raster scan line are output from ADC 312 on a bus 316 and on a bus 317 from ADC 314. The detectors in extension 307 and 308 of arm 306 are optically aligned with pixels that were coincident with each other or in registration when the films were recording the low and high X-ray energy images so no spatial interpolation is required before these pixels are subtracted from each other.

As stated, the detector pairs ultimately scan the whole image on both films while the films rotate. After each horizontal line of pixel elements is scanned, arm 306 is indexed vertically by one line. Indexing is accomplished with a stepping motor 318 which is mechanically coupled to arm 306 by a mechanism symbolized by the dashed line 319. Stepping motor 318 is controlled by a controller represented by the block marked 320. The pulses from encoder 303 are supplied by way of a line 321 to some timing circuits which are symbolized by the block marked 322. These timing circuits contain conventional means that count encoder pulses and calculate the times during which the films enter and leave the part of their orbital path during which readout is to occur and, during the time that readout is blanked, the timing circuits send appropriate signals to the motor control 320 for causing motor 318 to index arm 306 so that the next lowermost horizontal line of pixels can be read out.

As previously discussed, the rows of digitized pixels are simultaneous output from ADCs 312 and 314. These pixels are addresses to next ensuing gamma correction LUTs 323 and 324 which are comparable in function and purpose to LUTs 123 and 124 which have been previously discussed in connection with FIG. 9.

In FIG. 14, the digital pixel signals for the high X-ray energy exposed film are input to a multiplier 325. The digital pixels from the low X-ray energy exposed film are output from LUT 324 to a multiplier 326. Registered pixels from the low energy and high energy films enter multipliers 325 and 326 simultaneously. In multiplier 325, the digital pixel data are multiplied by a weighting coefficient $K_H$ as indicated in FIG. 14. Similarly, the low energy pixel data are multiplied by a weighting coefficient $K_L$. These coefficients are selectable and are chosen to achieve the desired cancellation. Thus, the weighted signals from multipliers 325 and 326 are fed into an ALU 327 wherein each pair of registered low and high energy pixels are subtracted and sent to a shift register 331. This register is clocked by the clock or timing pulse train supplied by way of line 330 from encoder 303. Register 331 assures that the film recorder in which the energy difference image is finally recorded will always be fed with valid stable data rather than incomplete data that might otherwise be introduced by the components of the system undergoing transitions between pixel. In any event, the sequence of energy difference pixels are output from register 331 and are fed by way of a bus 332 as addresses to a window/level LUT 333 which performs the functions of LUT 147 which was previously described in connection with the FIG. 9 readout system. In FIG. 14, the adjusted pixel values are put on a bus 334 to a DAC 335 wherein the digital pixel signals are converted to analog signals. The output on line 336 from DAC 335 leads to a film recorder comparable to recorder 144 which was previously discussed in connection with FIG. 9.

Although several film packages and readout systems have been described in detail, such description is intended to be illustrative rather than limiting, for the inventions may be variously embodied and are to be limited only by interpretation of the claims which follow.

We claim:

1. Apparatus for combining two X-ray images of an anatomical region recorded simultaneously on film where one of the images corresponds to having exposed said region primarily to a high energy spectral band in a broad energy spectrum X-ray beam and the other image corresponds to having exposed said region primarily to a relatively lower energy spectral band in said broad spectrum and said images on the film are represented by a sequence of alternative lines of picture elements (pixels) composing the different images, said apparatus comprising:

means for optically scanning said film transversely to said lines repeatedly over the width of the film, and detector means responsive to said scanning by producing alternating amplitude analog signals representative of the intensities of the pixels in the alternate low energy and higher energy image lines, clock pulse generating means coupled to said detector means and operative to produce clock pulses in synchronism with the alternate low and high energy analog signals, analog-to-digital converter (ADC) means having input means for said analog signals and having output means, said ADC means responding to occurrence of clock pulses by converting the corresponding analog pixel signal to alternate low and high energy digital pixel signals, first and second multiple stage shift registers having input means and means coupling said input means, respectively, to the output means of said ADC means, said shift registers responding to occurrence of alternate clock pulses corresponding to low and high energy analog signals, respectively, by entering a low and high energy digital pixel signal in the first stage of each register and by shifting from stage to stage in response to occurrence of successive clock pulses, spatial interpolation circuit means for obtaining substantial coincidence between low and high energy pixels in the adjacent lines on the film, said circuit means comprising sets of digital signal multipliers for each register, said multipliers in a set having inputs coupled to the stages of said registers and an input for a spatial weighting coefficient signal and each multiplier having an output, said multipliers being operative to multiply the signals presently in the low and high energy shift register stages by said weighting coefficient signals, and, circuit means for performing arithmetic and logic operations and having inputs coupled to the outputs of the multipliers and having output means and operative to combine the weighted pixel signals from the multiplier sets to produce composite interpolated low and high energy pixel signals and said circuit means is further operative to subtract related high and low energy pixel signals and to output a sequence of difference pixel signals for composing a single difference image.

2. The apparatus according to claim 1 including a digital-to-analog converter (DAC) having input and output means, means coupling the input means of the DAC to the output means of said arithmetic and logic operations circuit, said DAC being operative to convert said digital difference pixel signals to corresponding analog signals, and, film recorder means having input means for said analog signals and responsive thereto by recording said single image on photographic film.

3. The apparatus according to claim 1 wherein said means respectively coupling the input means of the registers to the output means of said ADC comprise look-up tables (LUTs) having input means coupled to the ADC means and output means coupled respectively to said shift registers, said LUTs storing a table of digital numbers corresponding to gamma correction values for the type of film on which said low and high energy images are recorded relative to the intensities of the pixels, said values being located in said tables at addresses corresponding to uncorrected digital pixel signals and said pixel signals from the ADC means constituting addresses to the corrected values such that the corrected values are output to said registers.

4. Apparatus for combining two X-ray images of an anatomical region recorded simultaneously on film where one of the images corresponds to having exposed said region primarily to a high energy spectral band in a broad energy spectrum X-ray beam and the other images corresponds to having exposed said region primarily to a relatively lower energy spectral band in said broad spectrum and said images on the film are represented by a sequence of alternating lines of picture elements (pixels) composing the different images, said apparatus comprising:

means for optically scanning said film transversely to said lines repeatedly over the width of the film and means responsible to said scanning by producing alternating amplitude analog signals representative of the intensities of the pixels in the alternate low energy and higher energy image lines, a phase locked loop having an input for said alternating analog signals and having an output, said loop being operative to provide on its output a series of clock pulses corresponding to occurrence of the low and high energy analog signals, respectively, logic circuit means having an input coupled to said output of said loop and having a plurality of outputs, said logic circuit means being operative to output two trains of timing pulses one of which corresponds to occurrence of low energy analog signals and the other to high energy analog signals, an analog-to-digital converter (ADC) having an input for said analog signals and an input for said clock pulses and having an output, said converter being controlled by said clock pulses to convert said analog signals to corresponding alternate low and high energy digital pixel signals, first and second multiple stage shift registers each having an input and a plurality of outputs and means coupling the inputs of said registers to the output of said ADC, said shift registers being controlled by said timing pulses to enter the low and high energy digital pixel signals from said ADC alternately in their first stage, respectively, as the digital signals are produced by said ADC and to shift by one stage in response to each timing pulse, spatial interpolation circuit means comprising sets of digital signal multipliers for each shift register, each set having multipliers corresponding to the stages in the shift registers, respectively, each multiplier in a set having an input for a spatial weighting coefficient signal and each having an output, said multipliers being operative to multiply the signals presently in the low and high energy shift register stages by said weighting coefficient signals, and circuit means for performing arithmetic and logic operations, said means having inputs coupled to the outputs of said multipliers and operative to combine the weighted pixel signals from each set of multipliers to produce composite interpolated low and high energy pixel signals compensated for the spatial error inherent in a low energy pixel occurring in one line on the film and the nominally corresponding high energy pixel occurring in an adjacent line and said means for performing arithmetic and logic operations is further operative to subtract related composite high and low energy pixel signals as they are developed and to output a sequence of difference pixel signals for composing a single image.

5. Apparatus for combining two X-ray images of an anatomical region recorded simultaneously on films where one of the images corresponds to having exposed said region primarily to a high energy X-ray spectral band in a broad energy spectrum X-ray beam and the other image corresponds to having exposed said region primarily to a relatively lower energy spectral band in said broad spectrum, said apparatus comprising:

holder means for holding the two films adjacent each other so a line of picture elements (pixels) on one film will be aligned in an endwise fashion with a corresponding line of pixels on the other film, means including a rotating mirror and a motor to rotate the mirror for optically scanning said films along said lines until the dimension of the images in a direction perpendicular to the scanning direction has been scanned, and a detector means responding to light reflected by the mirror by producing alternating amplitude analog signals representative of the intensities of the pixels in the low and high energy image lines, encoder means driven by said motor and operative to produce a sequence of clock pulses indicative of the rotational position of the mirror and the pixel being scanned, analog-to-digital converter (ADC) means having input means for said analog pixel signals and having output means, said ADC means responding to occurrence of clock pulses by converting the corresponding analog signals to digital pixel signals, first and second memory means having input means and means coupling said input means, respectively, to said output means of the ADC means, timing means coupled to said first and second memory means for controlling said memory means, respectively, to enable one memory means to accept a line of digital pixel signals for one film and to alternately enable the other memory to receive a corresponding line of digital pixel signals for the other film, first and second multiplier means each having input and output means, the output means of the first and second memory means coupled respectively, to input means of the first and second multiplier means, said multiplier means each being operative to multiply the successive digital pixel signals in each line by weighting coefficients, respectively, and circuit means for performing arithmetic and logic operations and having an output and inputs coupled to the respective outputs of said multiplier means, said circuit means operating to combine corresponding weighted high and low energy digital pixel signals and output a sequence of combined pixel signals for composing a single image.

6. The apparatus according to claim 5 including a digital-to-analog converter (DAC) having input and output means, means coupling the input means of the DAC to the output means of said arithmetic and logic operations circuit, said DAC being operative to convert said combined digital pixel signals to corresponding analog signals, and film recorder means having input means for said analog signals and responsive thereto by recording said single image on photographic film.

7. The apparatus according to claim 5 wherein said means respectively coupling the input means of the memory means to the output means of said ADC comprise look-up tables (LUTs) having input means coupled to the ADC and output means coupled respectively to said memory means, said LUTs storing a table of digital numbers corresponding to gamma correction values for the type of film on which said low and high energy images are recorded relative to the intensities of the pixels, said values being located in said tables at addresses corresponding to corrected digital pixel signals and said pixel signals from the ADC constituting addresses to the corrected values such that the latter are ouput to said memory means, respectively.

8. The apparatus according to claim 5 including means for assuring that the corresponding line of pixels on each film will lie in the same plane perpendicular to the rotational axis of the mirror during each revolution of the mirror, said films containing reference markers constituting shadowgraphs of a corresponding radiopaque marker element that is interposed in the X-ray beam during an X-ray exposure such that when the films are separated and arranged in said holder a shadowgraph of the reference marker will appear on each film, said reference marker comprised of a pair of diverging boundary lines, means supporting said film holder means for tilting to dispose corresponding lines of pixels on each film in a plane perpendicular to the rotational axis of said mirror, a reversible motor mechanically coupled to said film holder means and operative to tilt said film holder means, computer means coupled to said memory means and programmed to detect the number of pixels and, hence, the distances existing between the diverging boundary lines of the reference markers for substantially corresponding lines of pixels on each film that are stored in said first and second memory means and are crossed by the boundary lines of the respective markers, and said computer means also programmed to produce an error signal indicative of the difference between said distances, reversible motor controller means coupled to said motor and responsive to said error signal by energizing said motor to cause said film holder to tilt sufficiently to reduce the difference between said distances to zero.

9. Apparatus for combining two X-ray images of an anatomical region recorded simultaneously on parallel film emulsion layers where one of the images corresponds to having exposed said region to a high energy X-ray spectral band in a broad energy spectrum X-ray beam and the other image corresponds to having exposed said region primarily to a lower energy spectral band in said broad spectrum and there is a reflective material interposed between said layers, at least during the process of deriving information from the film emulsion layers, said apparatus comprising:

film holder means and a motor operatively coupled to the holder means for driving said means rotationally about an axis, said holder means holding said film emulsion layers on opposite sides of said reflective material in a curved configuration having a uniform radius of curvature from said axis, means for projecting light on both layers and means for optically scanning corresponding picture elements (pixels) in corresponding lines of pixels in opposite layers simultaneously as said film orbits about said axis, said scanning means including first and second photodetector means responding to the intensity of the coincident pixels on each layer by producing analog signals, respectively, proportional in amplitude to the intensities, encoder means operative to produce clock pulses, respectively, corresponding to the time coincident pixels are being scanned, first and second analog-to-digital converters (ADCs) having input means for said analog signals, respectively, and each having output means, said ADCs responding to occurrence of a clock pulse by converting the analog signals corresponding in time to digital pixel signals, first and second multipliers having input and output means and means coupling the input means of the multipliers to the output means of the ADCs, respectively, said multipliers multiplying the digital pixel signals from the ADCs by weighting factors, respectively, circuit means for performing arithmetic and logic operations having an output and having inputs coupled to the output means of said multipliers, said circuit means operating to combine corresponding high and low energy digital pixel signals and output a sequence of combined pixel signals for composing a single image.

10. The apparatus according to claim 9 including a digital-to-analog converter (DAC) having input and output means, means coupling the input means of the DAC to the output means of said arithmetic and logic operations circuit, said DAC being operative to convert said combined digital pixel signals to corresponding analog signals, and film recorder means having input means for said analog signals and responsive thereto by recording said single image on photographic film.

11. The apparatus according to claim 9 wherein said means respectively coupling the input means of the multiplier to the output means of said ADC comprises look-up tables (LUTs) having input means coupled to the ADC and output means coupled respectively to said multiplier means, said LUTs storing a table of digital numbers corresponding to gamma correction values for the type of film on which said low and high energy images are recorded relative to the intensities of the pixels, said values being located in said tables at addresses corresponding to corrected digital pixel signals and said pixel signals from the ADC constituting addresses to the corrected values such that the latter are output to said multiplier respectively.

* * * * *